United States Patent [19]

Walker

[11] Patent Number: 4,813,114
[45] Date of Patent: Mar. 21, 1989

[54] MACHINING THE ENDS OF ROUND BAR AND TUBE AND SIMILAR WORKPIECES

[75] Inventor: Derek W. R. Walker, Claverley, England

[73] Assignee: Lucas Industries public limited company, Birmingham, England

[21] Appl. No.: 113,540

[22] Filed: Oct. 26, 1987

[30] Foreign Application Priority Data

Oct. 24, 1986 [GB] United Kingdom ............... 8625497

[51] Int. Cl.⁴ .................. B23Q 41/06; B65H 51/26
[52] U.S. Cl. .............................. 29/33 T; 409/167; 414/432
[58] Field of Search .............. 29/33 T, 564, 453; 409/165, 166, 167; 82/4 C, 101, 2.5, 39; 51/236; 414/432, 222, 431, 433; 198/782

[56] References Cited

U.S. PATENT DOCUMENTS

| | | | |
|---|---|---|---|
| 2,820,367 | 1/1958 | Frantz et al. | 414/432 |
| 3,434,610 | 3/1969 | Wilson | 414/432 |
| 3,664,531 | 5/1972 | Magusson et al. | 414/432 |
| 3,713,555 | 1/1973 | Wloszek | 414/432 |
| 4,156,949 | 6/1979 | Ziegelmeyer | 51/236 Y |
| 4,412,401 | 11/1983 | Fundell | 82/4 C |
| 4,516,306 | 5/1985 | Albert | 29/564 |
| 4,516,307 | 5/1985 | Beard et al. | 29/564 |

FOREIGN PATENT DOCUMENTS

197809  9/1978  German Democratic Rep. .... 29/33 T
1220737 3/1986  U.S.S.R. .............................. 29/33 T

Primary Examiner—William Briggs
Attorney, Agent, or Firm—Oldham & Oldham Co.

[57] ABSTRACT

Elongate round workpieces W (e.g. bar or tube) are loaded singly from a rack (252) on to a supporting cradle formed by four ball castors (38). At each end of the cradle is an upper operating unit (20) and (22) comprising a machining unit having a chamfering tool (34) and a workpiece-driving unit having a driving wheel (32) in frictional engagement with the workpiece. The wheels (32) are rotated about their axes to rotate the workpiece, and further can be pivoted to each side of a neutral position in order to drive the workpiece along its length into engagement with first one chamfering tool and then the other. The operating units are mounted on upper guide rails (16) and (18) for adjustment of the distance between them. Lower operating units mounted on lower guide rails (24) and (26) comprise deburring tools (36) which also operate on the workpiece ends, adjacent to the chamfering tools (34).

9 Claims, 10 Drawing Sheets

MACHINING THE ENDS OF ROUND BAR AND TUBE AND SIMILIAR WORKPIECES

This invention is concerned with apparatus for the automatic or semi-automatic removal of surplus material from the ends of elongate workpieces of round cross-section such as bar and tube. For example, such apparatus may be especially suitable for deburring and chamfering operations.

One known machine of that kind is described in patent specification GB-A-1 392 250. That known machine comprises two operating units, comprising machining heads, mounted in aligned opposition at opposite ends of a workpiece-supporting platform. The operating units are mounted on rails and movable towards and away from each other, for use in setting up the machine to accommodate different lengths of workpiece. In operation of the machine, a cylindrical workpiece is loaded on to the platform and clamped against rotation. The machining heads are then simultaneously moved in to engage the opposite ends of the workpiece, and the workpiece ends so become machined by rotation of axially aligned cutting tools mounted on the heads. The tools are of either male or female conical form, as required respectively for internal and external chamfering of a workpiece. The tools are of similar diameter to the workpiece, so as to operate on the whole of the workpiece periphery simultaneously; there is therefore no requirement for rotation of the workpiece during machining or, alternatively, revolution of the rotating cutting heads bodily about the workpiece axis.

Patent specifications GB-A-1 203 651 and GB-A-2 149 702 describe apparatuses for similar purposes but in which the cutting heads are arranged for orbital movements in order to follow the periphery of the end of a workpiece whilst machining it. Such an arrangement can enable a relatively small cutting tool to machine all around the periphery of a workpiece, but is not especially suitable for larger workpieces.

It is an object of the present invention to provide improved apparatus for performing machining processes automatically or semi-automatically on the ends of elongate workpieces of round cross-section, especially with a view to catering for a wide range of workpiece diameters and lengths in setting up the apparatus, and the ability to accept without adjustment substantial variation in the lengths of workpieces in a batch to be processed automatically.

The invention provides, in one of its aspects, apparatus for the automtic or semi-automatic removal of surplus material from the ends of elongate workpieces of round cross-section such as bar and tube, the apparatus comprising workpiece-supporting means whereby a workpiece can be supported in a manner permitting the workpiece both to be rotated about its axis and to be moved along its length, machining means comprising a machining assembly positioned generally at one end of the workpiece-supporting means, and workpiece-driving means whereby a workpiece on the workpiece-supporting means can both be driven lengthwise into engagement of one of its ends with a machining tool mounted on the machining assembly and be rotated during a machining operation on it by the tool.

The workpiece-supporting means can conveniently comprise rollers for support of the workpiece, and most preferably ball castors forming a cradle are so employed to permit both the rotational and lengthwise movements of a workpiece seated on them. In a preferred arrangement, at least two pairs of ball castors are spaced apart longitudinally of the axis of the workpiece, the castors of each pair being spaced apart to opposite sides of a vertical plane through the axis. The spacings of the castors are preferably adjustable to accommodate different lengths and diameters of workpiece, and for long thin workpieces more than two pairs may need to be employed.

The workpiece-driving means may comprise at least one driving wheel arranged to make frictional engagement with a surface of the workpiece, in order to impart rotational movements to the workpiece by rotation of the driving wheel. The driving wheel may suitably comprise a tread of rubber or like material for engagement with the surface of the workpiece. In order to move the workpiece in both directions lengthwise, as well as rotate it, the driving wheel can be mounted for pivotal movements to each side of a neutral position about an axis extending transversely of its rotational axis; by such pivotal movements, the tangents to the wheel and to the workpiece at the position of contact become inclined to one another, whereas they are coincident in the neutral position of the wheel. In the neutral position of the wheel the pivot axis most preferably lies in a common plane with parallel rotational axes of the driving wheel and the workpiece, though of course some variation from that precise geometrical arrangement is possible.

Preferably there is a machining assembly (e.g. for chamfering) positioned at each end of the workpiece-supporting means, in order that the two ends of a workpiece can be machined in turn; one end of the workpiece is first moved up to one machining assembly by the driving means, and the workpiece is then moved up to the other machining assembly for its other end to be machined, before being returned to a loading/ unloading position between the units. The apparatus preferably comprises workpiece loading/unloading means arranged to load a workpiece from storage (e.g. a rack) on to the workpiece-supporting means, and to unload a workpiece therefrom after machining of the workpiece.

The, or each, machining assembly may form part of an operating unit which is movably mounted for adjustment of its position longitudinally of the apparatus, to suit workpieces of widely varying length. The arrangement is preferably such that the, or each, operating unit also comprises a workpiece-engaging driving assembly of the workpiece-driving means.

There now follows a detailed description, to be read with reference to the accompanying drawings, of a deburring and chamfering machine which illustrates the invention by way of example.

Figure 1:
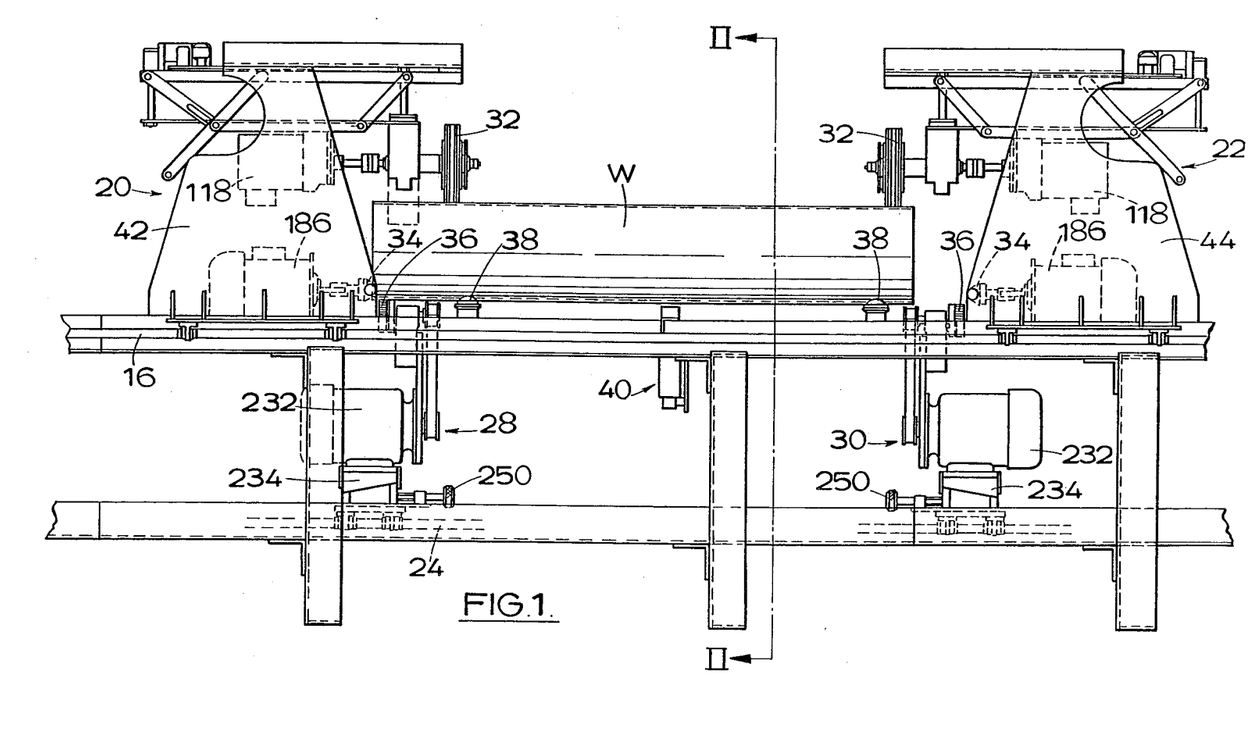
FIG. 1 is a side view of the machine.
Figure 2:
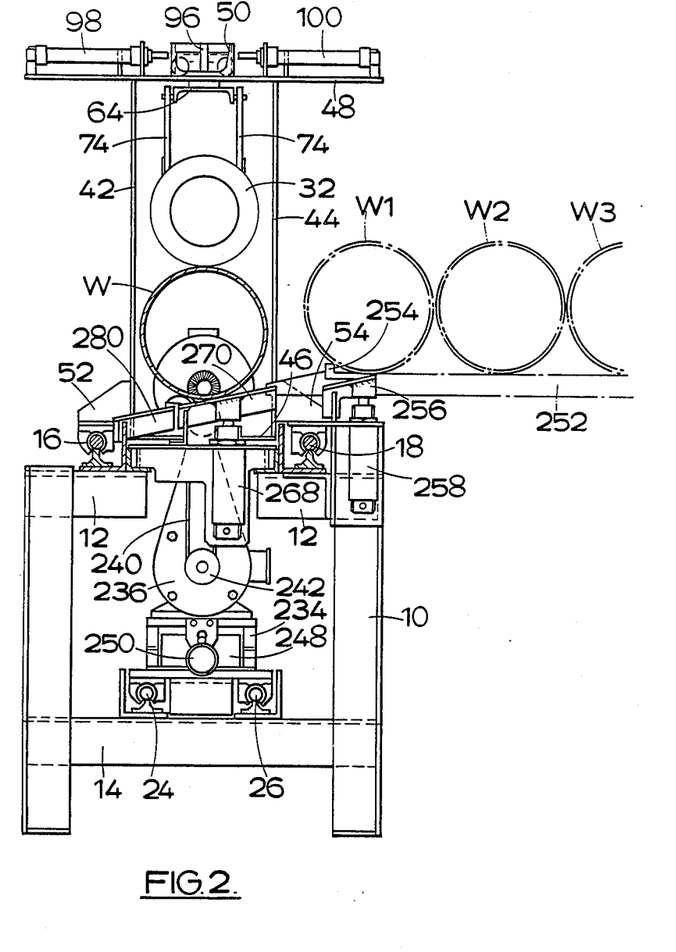
FIG. 2 is a view longitudinally of the machine, being a Section on II—II of FIG. 1.

A machine for use in the automatic deburring and chamfering of the ends of cut lengths of round bar or tube is shown in general arrangement in FIGS. 1 and 2 of the drawings.

The machine comprises a fabricated trestle-style base 10 which forms upper and lower platforms 12 and 14 (FIG. 2) for the support of upper and lower pairs of guide rails respectively. The upper pair of guide rails 16 and 18 supports two upper operating units 20 and 22, and the lower pair of guide rails 24 and 26 supports two lower operating units 28 and 30. The spacing between the two upper units 20 and 22, and between the two lower units 28 and 30, can be varied by sliding movements of the units along the guide rails.

The two upper operating units 20 and 22 are identical, each being a workpiece-driving and chamfering unit, comprising a workpiece-driving wheel 32 and a chamfering tool 34. The two lower operating units 28 and 30 are also identical, being deburring units comprising deburring tools 36.

The positions of the upper and lower operating units along the guide rails can be adjusted to accommodate a particular length of workpiece in a machining position between them (that is to say, with one upper operating unit and one lower operating unit positioned generally at each end of the opposite ends of a bar or tube workpiece).

In FIG. 1 a workpiece W in the form of tube is shown in position between the operating units, the workpiece being seated on a roller bed comprising four ballcastors 38. The castors 38 are arranged on the base 10 in two pairs, one pair being positioned adjacent to one upper operating unit 20 and the other pair adjacent to the other upper unit 22. The castors of each pair are spaced apart laterally of the base (i.e. in a direction transversely of the upper guide rails 16 and 18) so that the two pairs together form a cradle for the workpiece. The workpiece W, supported on the ball castors 38, so remains free to be rotated about its longitudinal axis, with its axis parallel to the upper guide rails 16 and 18. It can also be moved axially towards and away from the operating units 20,22,28 and 30. The machine comprises also workpiece loading/unloading means 40 whereby workpieces can be loaded one at a time from rack storage into the machining position, and unloaded from the machining position after deburring and chamfering.

Figure 3:
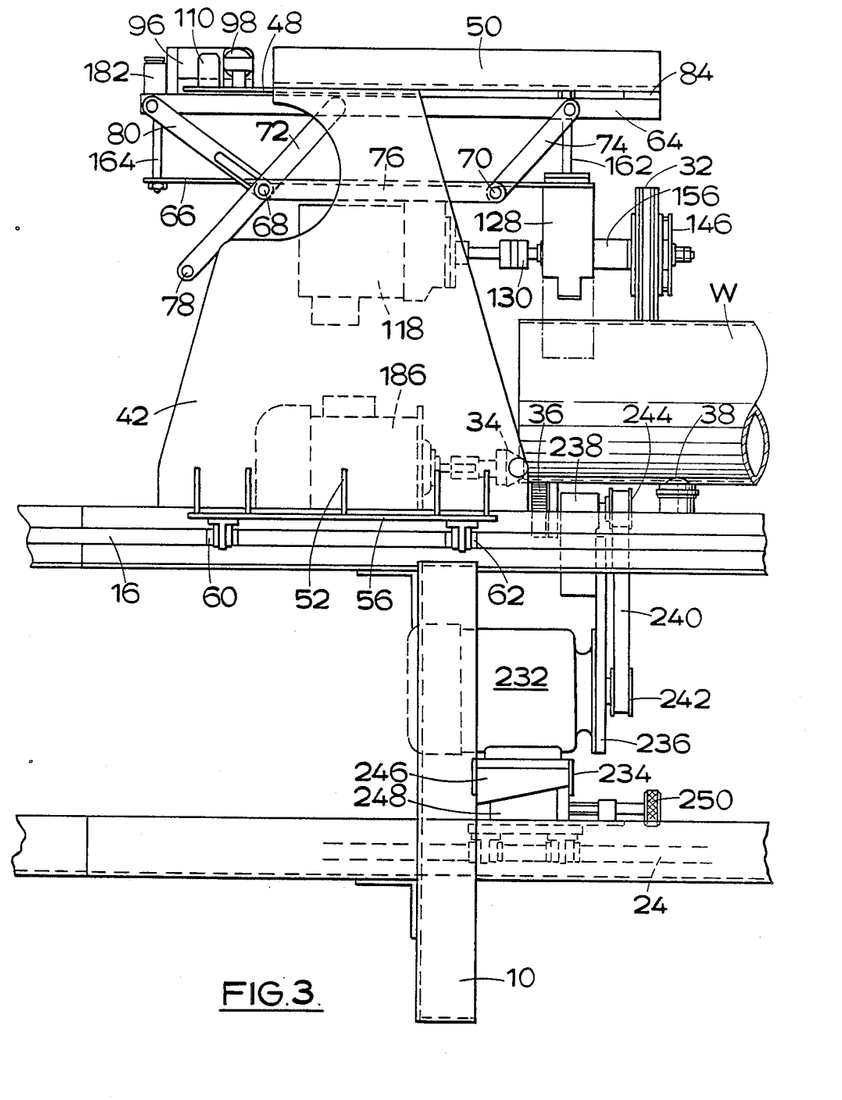
FIG. 3 is a view similar to FIG. 1 but showing left hand upper and lower operating units of the machine to a larger scale.

The construction of one of the upper operating units (the two being identical) will now be described in detail with reference initially to FIGS. 1, 2 and 3. The unit comprises a fabricated box frame comprising two parallel vertical side plates 42 and 44, maintained spaced apart by a horizontal bottom plate 46 and a horizontal top plate 48. The fabrication comprises also a length of top channel 50 secured centrally to the upper surface of the top plate 48 and extending parallel to the side plates to form a cantilever projecting beyond the limits of the side plates. Hanger plates 52 and 54, projecting outwards from the box frame at longitudinally spaced-apart positions along bottom margins of the side plates 42 and 44, carry mounting plates 56 and 58 (one at each side of the box) which each support front and rear bearings 60 and 62 (FIG. 1) whereby the box frame (as so the unit as a whole) is slidably mounted on the upper guide rails 16 and 18. Clamping means (not shown) enables the unit to be secured in adjusted position along the guide rails.

A workpiece-driving assembly of each upper operating unit, comprising the driving wheel 32 hereinbefore referred to, depends between the side plates 42 and 44 from the top of the box frame. The assembly comprises a horizontal upper suspension plate 64 of inverted channel section, and a horizontal flat lower suspension plate 66, one being positioned above the other between the side plates 42 and 44 of the box frame. The lower suspension plate 66 rests on two transversely extending lifting bars 68 and 70 which are carried at their ends by two pairs of pivoting suspension links 72 and 74 extending down from side flanges of the upper suspension plate. The four links are in parallel, with the lower plate 66 being accommodated between them, and the spacing between the lifting bars is maintained by a pair of spacing links 76. A parallel linkage arrangement is so formed, comprising the links 72, 74, 76 and the upper suspension plate 64, enabling the lower suspension plate to be raised and lowered relative to the upper suspension plate 64 whilst remaining horizontal. A handle for so raising and lowering the lower plate 66 is provided by a bar 78 extending between extensions of the two links 72 beyond the lifting bar 68. Also, a pair of slotted guide links 80 extends between the ends of the liftiing bar 68 and the upper suspension plate 64.

The manner in which the workpiece-driving assembly is mounted to depend from the top of the box frame will now be described with reference to FIGS. 3, 4 and 5. As seen from FIG. 3, the upper suspension plate 64 of the workpiece-driving assembly is suspended horizontally immediately beneath the horizontal box frame top member comprising the top plate 48 and top channel 50. The suspension plate 64 is spaced from the box frame top member by a small clearance. Inner end portions of the suspension plate 64 and the top channel 50, above the driving wheel 32, are pivotally secured together by means of a vertical pivot bolt 82; the bolt passes through a spacer 84, between the plate 64 and channel 50, which maintains the required spacing. Outer end portions of the upper suspension plate 64 and the top plate 48 of the box frame are shown in detail in FIGS. 4 and 5, from which it can be seen that the suspension plate (beneath) extends beyond the top plate (above). Welded to an upper surface of the suspension plate 64 is an upstanding block mounting 86 for two rollers 88 and 90. The rollers 88 and 90 are free to spin about roller pins 92 and 94 secured to the mounting 86; the two roller pins are horizontal and in parallel, being spaced apart transversely of the upper suspension plate 64 and aligned longitudinally of the plate. The two rollers bear against an upper surface of the top plate 48 of the box frame and the outer end portion of the suspension plate is so supported. The workpiece-driving assembly is in this way mounted free to swing about the pivot bolt 82, to either side of a central position between the side plates 42 and 44 of the box frame, the rollers 88 and 90 rolling over the upper surface of the top plate 48 during such swinging movements.

Figure 4:
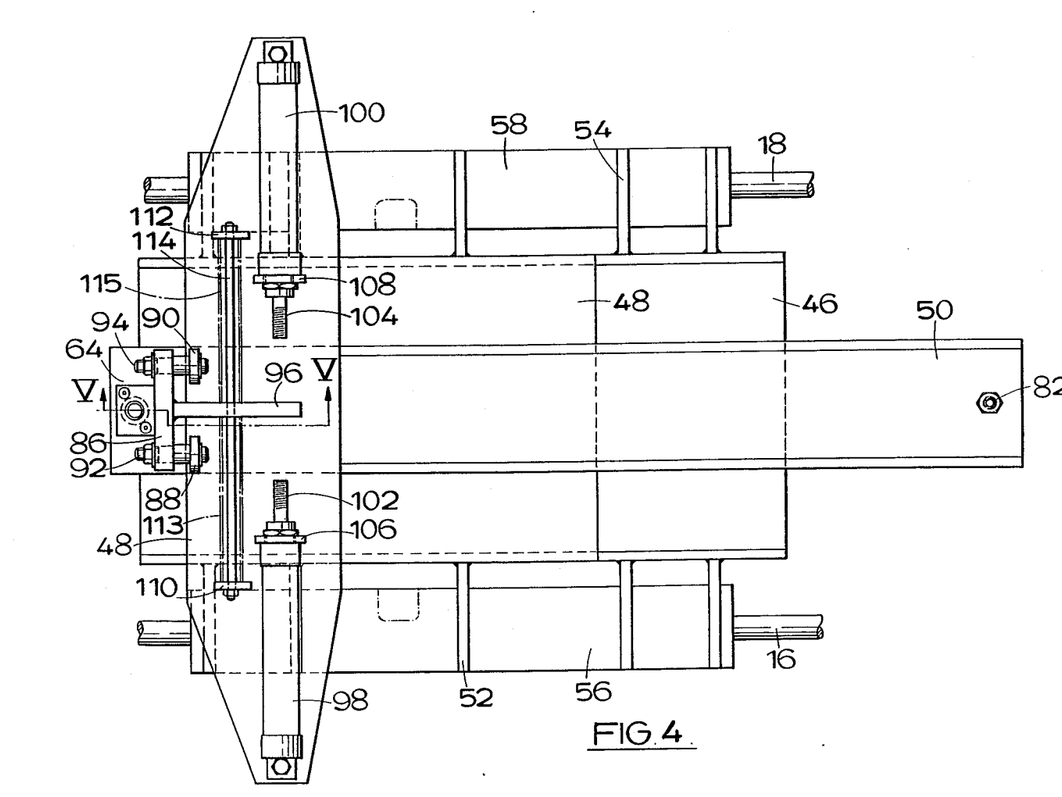
FIG. 4 is a partial plan view from above of the upper operating unit of the machine.
Figure 5:
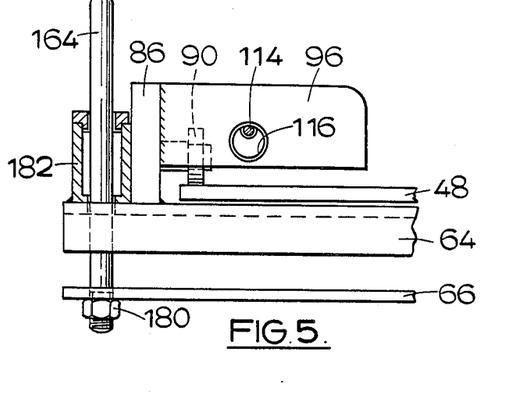
FIG. 5 is a Section on V—V of FIG. 4.

Means to effect swinging of the workpiece-driving assembly, for a purpose to be described hereinafter, is also shown in FIGS. 4 and 5. A vertical flag plate 96 projects horizontally from the block mounting 86 in a direction longitudinally of the upper suspension plate 64, at a position between the rollers 88 and 90 and at a level above the top plate 48 of the box frame. The flag plate 96 is so supported by the block mounting 86 at a position between two opposed pneumatic cylinders 98 and 100 which are transversely mounted on the top plate 48. Actuating rods 102 and 104 of the cylinders 98 and 100 are arranged to abut the flag plate (from opposite sides) and so the plates, and consequently the workpiece-driving assembly as a whole, can be pushed by the cylinders to one side or the other of its central position. The cylinders 98 and 100 are secured to the top plate 48 by means of a first pair of mounting brackets 106 and 108 upstanding from the top plate. A second pair of such mounting brackets 110 and 112 enables a spring return rod 114 to be secured above the top plate 48, the rod being aligned in parallel with the cylinders 98 and 100 and extending through a relatively large diameter opening 116 in the flag plate 96. The rod-securing brackets 110 and 112 are spaced equally to opposite sides of the flag plate 96 in its central position and compression coil springs 113 and 115 on the rod 114 extend between the brackets and side faces of the flag plate around the opening 116. The springs are so arranged as return springs to urge the workpiece-driving assembly to its central position.

Figure 6:
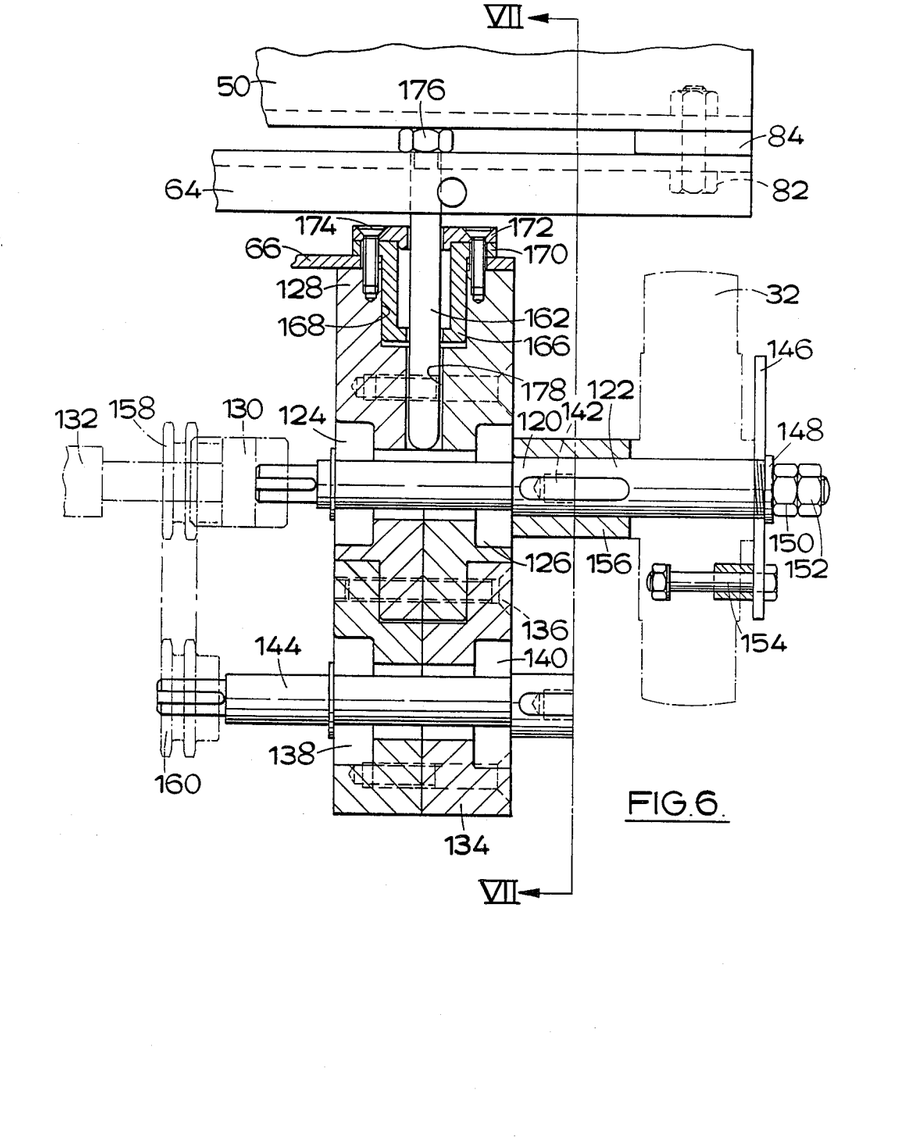
FIG. 6 is a view in vertical section through a driving wheel spindle mounting.
Figure 7:
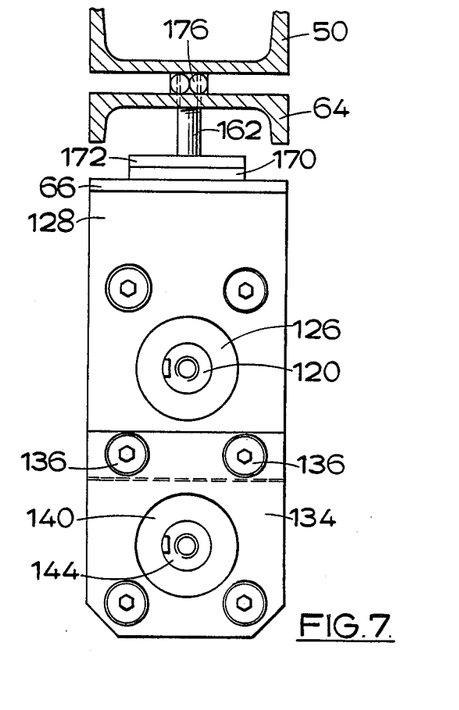
FIG. 7 is an end view of the spindle mounting on Section VII—VII of FIG. 6.

A driving unit of the workpiece-driving assembly comprises an electric motor 118 (FIG. 3) bolted to the underside of the lower suspension plate 66. The motor is mounted with its axis horizontal and aligned longitudinally of the assembly. As shown in FIGS. 6 and 7, the driving wheel 32 is mounted on an end portion of a two-part wheel spindle 120 and 122, for rotation with the spindle. The spindle is mounted in bearings 124 and 126 housed in a spindle mounting block 128, and extends through the block to a coupling 130 whereby it is coupled to an output shaft 132 of the motor 118. The motor is so arranged to rotate the wheel.

Also in FIGS. 6 and 7 is an extension block 134 providing an alternative (lower) driving position for the wheel 32. The extension block 134 is releasably secured by screws 136 to the bottom of the mounting block 128 in a tongue-and-groove type of connection, and houses two bearings 138 and 140 similarly to the mounting block 128. The two-part wheel spindle 120 and 122 comprises an upper driving spindle 120 which is secured in the bearings 124 and 126 in the mounting block 128, and a removable extension piece 122 which carries the wheel 32 and is releasably secured to the driving spindle 120 by means of a screw-threaded interconnection 142. A lower driving spindle 144 is mounted in the bearings 138 and 140 in the extension block 134, and is a similar form to the upper driving spindle 120 to receive the extension piece 122 and driving wheel 32 when required.

The driving wheel 32 is secured to the extension piece 122 by means of a retaining plate 146. The plate 146 is non-rotatably mounted on the extension piece flats machined on the extension piece engaging corresponding straight edges of the plate. The plate is retained by means of a washer 148 and nuts 150 and 152 mounted on a screw-threaded end portion of the extension piece 122. Three bolts 154, equi-spaced around the axis of the extension piece 122, secure the wheel 32 to the retaining plate 146. A spacing sleeve 156 acts between the wheel 32 and the bearing 126 or 140, respectively, around the connection between the extension piece 122 and the selected driving spindle. The lower driving spindle 144 is arranged to be chain-driven by means of sprocket wheels 158 and 160 mounted on the motor output shaft 132 and the lower driving spindle 144, respectively.

FIGS. 6 and 7 also illustrate securement of the spindle mounting block 128 to the underside of the lower suspension plate 66, and provision of a first vertical guide rod 162. A second guide rod 164 acts similarly at the opposite end of the workpiece-driving assembly, as shown in FIG. 5. Referring initially to FIGS. 6 and 7, a cylindrical linear bearing 166 is mounted vertically in a well 168 formed in the top of the spindle mounting block 128. The bearing 166 extends down from a head flange 170 through an aperture in the lower suspension plate 66, the flange 170 overlying the plate 66 around the aperture. A cover plate 172 fits over the head flange. Screws 174 passing through the cover plate 172, the head flange 170 and the lower suspension plate 66 secure the bearing 166 to the mounting block 128, and the mounting block to the suspension plates 66. The guide rod 162 is freely slidable in the linear bearing 166, a screw-threaded upper end portion of the rod being secured by means of a nut 176 in an aperture in the upper suspension plate 64, and the rod extending downwards through an aperture in the bearing cover plate 172, through the linear bearing 166, and into a vertical clearance bore 178 in the mounting block 128.

With reference to FIG. 5, a screw-threaded bottom end portion of the second guide rod 164 is secured by means of a nut 180 in an aperture in the lower suspension plate 66. The rod extends upwards through an opening in the upper suspension plate 64 and through a cylindrical linear bearing 182 mounted vertically on the upper surface of the plate adjacent to the block mounting 86.

The workpiece-driving assembly is so mounted for both vertical movements, as guided by the guide rods 162 and 164 and the parallel linkage arrangement supporting the lower suspension plate 66, and horizontal side-to-side swing movements about the vertical axis of the pivot bolt 82. It is to be noted that the vertical pivot bolt axis intersects the horizontal rotational axis of the mounted driving wheel 32 at the centre of the wheel; the pivot axis and th rotational axes of the wheel and the workpiece all lie in a common vertical plane when the workpiece-driving assembly is in its central position. It is further to be noted that when the workpiece-driving assembly is in its central position (i.e. as seen in FIGS. 2 and 4, at least) the rotational axis of the driving wheel 32 is parallel to the upper guide rails 16 and 18, and so also to the axis of the cylindrical workpiece W on the ball castors 38.

Figure 8:
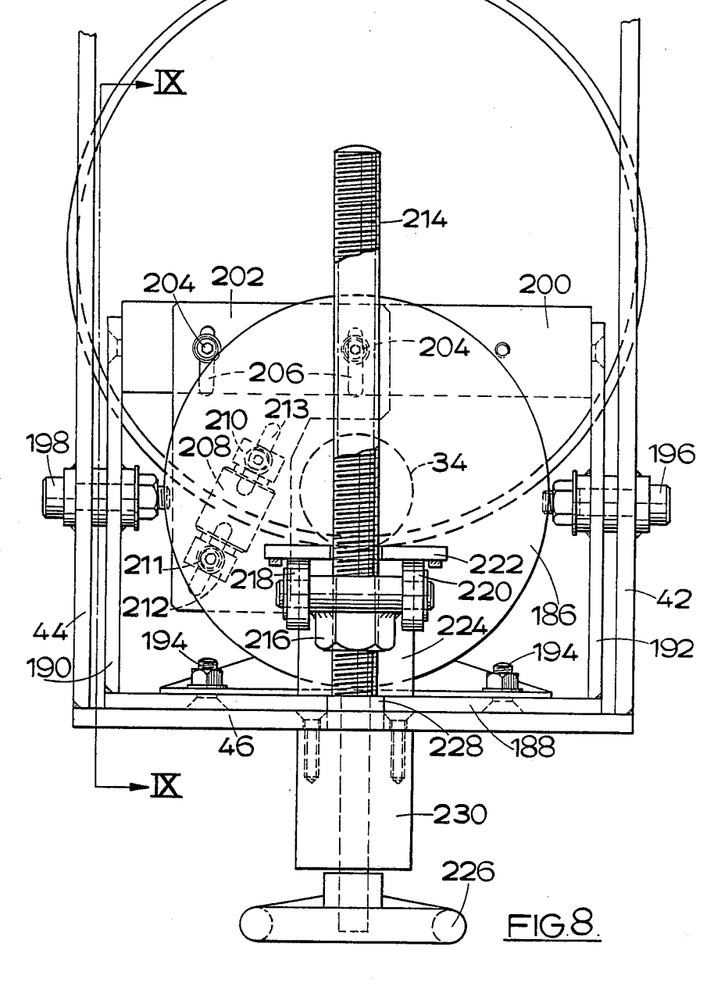
FIG. 8 is an outer end view of a chamfering assembly.
Figure 9:
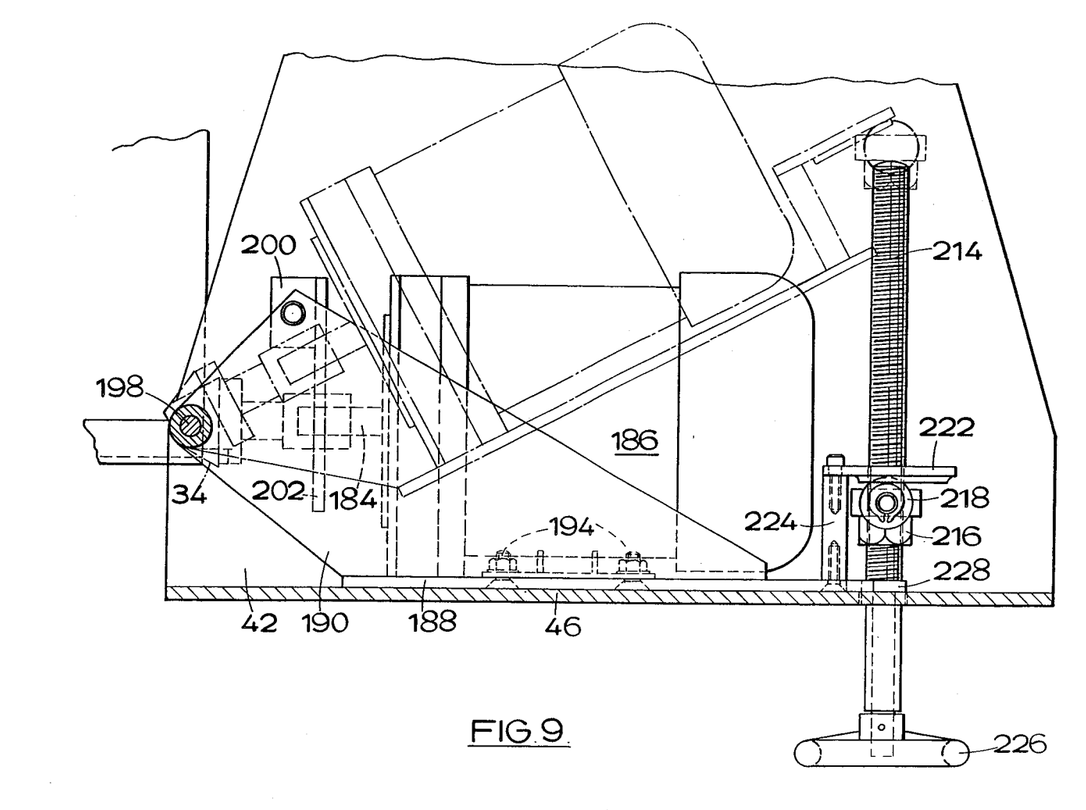
FIG. 9 is a side view of the chamfering assembly on Section IX—IX of FIG. 8.

A machining (that is, chamfering) assembly of one of the upper operating units is shown in more detail in FIGS. 8 and 9.

The chamfering tool 34 is connected to an output shaft 184 of an electrical motor 186. The motor 186 is bolted down to a bottom plate 188 of a motor cradle commprising also vertical side walls 190 and 192. The securing bolts are indicated as 194. The cradle fits between the side plates 42 and 44 of the box frame of the operating unit, and can rest with its bottom plate 188 flat down on the upper surface of the bottom plate 46 of the unit (as shown in FIGS. 8 and 9). At its inner end (i.e. that end nearer to the workpiece W) the side walls 190 and 192 of the cradle are pivotally secured to the side plates 43 and 44 of the box frame by means of shoulder screws 196 and 198 in a suitable manner to permit pivoting of the cradle upwards about the common horizontal axis of the two shoulder screws. In such a manner the angle at which the chamfering tool 34 engages the workpiece can be varied in a vertical plane parallel to the upper guide rails 16 and 18.

A support block 200 is secured to extend between the side walls 190 and 192 of the cradle. A roller-support plate 202 is adjustably secured to the support block 200; headed fastenings 204 extend through slots 206 to permit adjustment, as seen in FIG. 8. The plate 202 extends downwards from the block 200, and at a position laterally between the chamfering tool 34 and one of the shoulder screw fastenings 198 the plate 202 carries a stop roller 208. The roller 208 is freely rotatably mounted between the ends of two arms 210 and 212 which are secured by two screws 211 to the plate 202 to project in parallel towards the workpiece W. Slots 213 in the plate permit adjustment of the roller position radially of the workpiece. In FIG. 9 the position of the roller-support plate 202 is indicated but the arms and roller are omitted for clarity. The position of the stop roller 208 is such that it stops axial approach of the workpiece at a suitable position for completion of a chamfering operation by the tool 34. The roller is aligned and positioned to run circumferentially along an end face of the workpiece, as indicated in FIG. 8.

Means for manually elevating and lowering the outer end of the cradle comprises a motor tilting screw 214 which is screw-threadedly engaged with a trunnion 216 (see FIGS. 8 and 9). The trunnion carries two freely rotatable rollers 218 and 220 which are arranged to bear against undersurfaces of a yoke plate 222 which projects from the top of a support block 224 and straddles the screw 214. The support block projects upwards from the bottom plate 188 of the cradle, to which it is secured. As seen in FIG. 9, when the cradle is fully down the yoke plate 222 is horizontal and the tilting screw 214 is vertical, with a handwheel 226 fastened to the bottom end of the screw for manual rotation of the screw. The screw 214 is supported vertically by an annular spacer 228. A shoulder at the lower end of the screw thread bears against the spacer, and a plain spindle of the screw extends down to the handwheel 226 successively through the spacer, an aperture in the bottom plate 188 of the box frame, and a bearing block 230 secured to the underside of the bottom plate. From the fully lowered position of the cradle, were the handwheel to be turned (in an appropriate direction) the trunnion 216 would be raised to lift the yoke plate 222 and so lift the cradle about its pivot axis. A fully raised position is indicated in broken lines in FIG. 9.

The lower operating units 28 and 30 of the machine will now be described with reference to FIGS. 1, 2 and 3. Each of the two identical units comprises an electric motor 232 for driving the deburring tool 36. The motor 232 is secured down to a carriage 234 which is slidably mounted on the lower guide rails 24 and 26. Means (not shown) is provided for clamping the carriage in a suitable position of adjustment along the guide rails. The motor is so mounted with its drive axis parallel to the guide rails. A vertical carrier plate 236 is secured to a mounting face of the motor and bears at its upper end a bearing block 238. A toothed belt 240 is arranged to transmit drive from a lower pulley 242 on the output shaft of the motor 232 to an upper pulley 244, from which rotational drive is transmitted by a spindle through the bearing block 238 to the deburring tool 36.

The deburring tool 36 is of a known kind comprising a cutting portion in the form of a milling cutter and an axially adjacent plain cylindrical portion which is arranged to abut the outer cylindrical surface of the workpiece to limit the depth of cut of the milling cutter in deburring the outer surface at the workpiece end.

The carriage 234 comprises upper and lower taper block 246 and 248 providing together a wedge action enabling the motor 232 (and so the deburring tool 36) to be raised and lowered. This allows for heightwise adjustment of the position of the tool 36 in setting up the machine for a particular workpiece diameter. An adjusting screw 250 is arranged to cause relative movements between the taper blocks in effecting such adjustment.

Workpieces W1, W2, W3 etc., for processing by the machine are stored on a rack 252 which stands beside the machine. The workpiece loading/unloading means 40 will now be described with reference particularly to FIG. 10 (which shows the arrangement as viewed from left to right in FIG. 1). Secured to the end of the rack 252 is a change piece stop 254, which presents a raised lip preventing the stored workpieces leaving the rack. A first lifting pad 256 is secured to a first double-acting lifting cylinder 258 which is aligned vertically beneath the pad 256 to raise and lower the pad. The lifting cylinder is secured to a mounting bracket 260 which is secured to the base 10. The bracket comprises an upstanding vertically-slotted limb 262 which serves as a guide for the lifting pad 256, which fits into the slot. A sloping top face 264 of the pad 256 is inclined latrally of the machine. The arrangement is such that upon being raised by the lifting cylinder 258, the lifting pad 256 will lift a workpiece W1 resting against the lip of the change piece stop 254 until the workpiece can roll down the inclined top face of the pad over the lip. The workpiece is from there guided by a nose 266 of the ramp to roll into position on the roller bed (comprising the ball castors 38) for machining.

Figure 10:
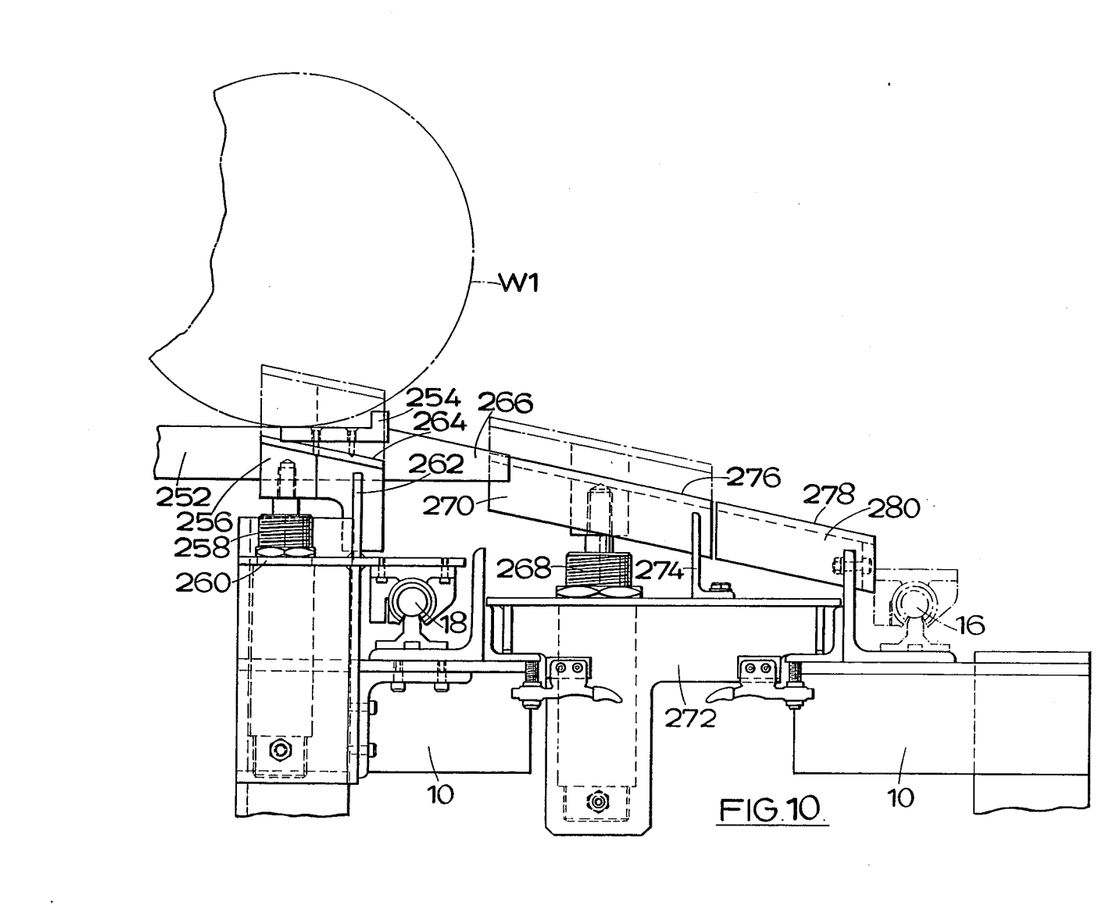
FIG. 10 is an end view, looking along the length of the machine, of workpiece loading/unloading means.

A second lifting cylinder 268 carrying a second lifting pad 270 is arranged to operate similarly to the first to unload a machined workpiece from the roller bed. The second cylinder 268 is secured vertically to a second mounting bracket 272 secured to the base 10, the pad 270 being guided in its vertical movements in a slot of a guide bracket 274 secured to the mounting bracket 272. When lifted from the roller bed by the second lifting pad 270, a workpiece will roll down an inclined top face 276 of the pad, and a similarly inclined top face 278 of an off-load ramp 280 to a collecting rack or other means (not shown) for collecting the machined workpieces.

Figure 11:
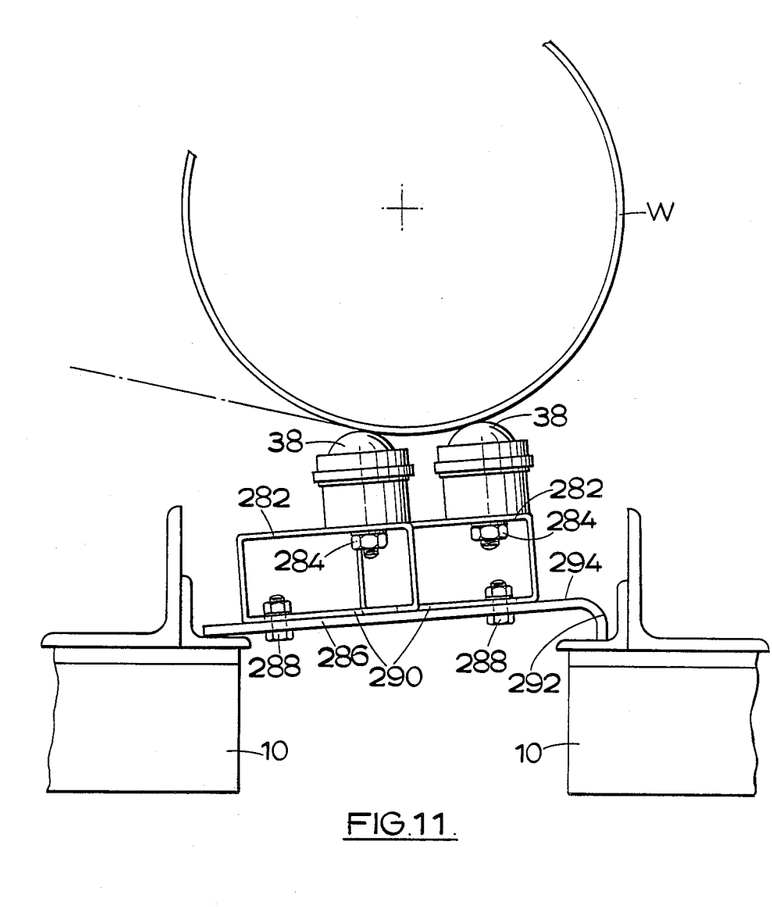
FIG. 11 is an end view showing the mounting of ball castors of a roller bed for supporting a workpiece during machining.

The mounting of the ball castors 38 of the roller bed is shown in FIG. 11. Each castor 38 comprises a screw-threaded stem locating it in a hole in the top wall 282 of a mounting box, the castor being secured by means of a nut 284 applied to the stem within the box. The mounting box is secured down to a mounting plate 286 by means of a nut-and-bolt fastening 288 which extends through a hole in the mounting plate and through an elongate slot in a bottom wall 290 of the box. The mounting plate 286 is mounted on the machine base 10 and comprises a flange 292 along one side (i.e. the flange extending longitudinally of the machine) so that a flat upper surface 294 of the plate to which the mounting box is secured is inclined transversely of the machine. Two mounting boxes (and so, two ball castors 38) are mounted together on one mounting plate 286, a second mounting plate (bearing the other two castors) being provided similarly at a suitable spacing from the first, lengthwise of the machine. On each mounting plate the positions of the two mounting boxes can separately be adjusted transversely of the machine, owing to the elongate slots in the bottom walls 290 of the boxes; the two slots are in parallel and spaced apart longitudinally of the machine, and as shown in FIG. 11 the boxes can overlap one another. Accordingly, the ball castors 38 of each pair can be adjusted in position transversely of the machine to provide a suitable spacing between them to accommodate any particular diameter of workpiece securely, one castor being raised higher than the other owing to the inclination of the upper surface 294 of the mounting plate 286.

Prior to the operation of the machine, adjustments are made, in the various ways hereinbefore referred to, to set the machine up for operation on a particular diameter and approximate length of workpiece. Allowance has also to be made for whether the workpieces are to be internally (for tube) or externally chamfered. With at least one workpiece stored ready on the storage rack 252, a first (or next) workpiece to be processed can be caused to roll down on to the roller bed (from right to left as seen in FIG. 2, and from left to right as seen in FIGS. 10 and 11) by operation of the first lifting cylinder 258 as hereinbefore described. Th workpiece comes to rest on the roller bed at a position generally between the two upper operating units 20 and 22, though with the driving wheels 32 engaging the cylindrical outer surface of the workpiece. The two workpiece-driving assemblies are at this stage at their central (or "neutral" positions) positions, with the rotational axes of the driving wheels 32 parallel to the axis of the workpiece.

The driving wheels 32, which comprise a thread of a rubbery material for firm frictional engagement with the workpiece surface, can now be employed both to rotate the workpiece about its axis and to move the workpiece axially into engagement with the tools of the operating units at each end successively. The former is achieved simply by operating the driving motors 118 whilst the driving assemblies remain in their central positions. In order to drive the workpiece axially the two driving assemblies are swung (both in the same rotational direction, clockwise or anticlockwise) by means of appropriate ones of the operating cylinders 98 and 100, as hereinbefore described. The driving wheels 32 so become pivoted on the surface of the workpiece, about the vertical axes of the pivot bolts 82, and being then inclined to the workpiece axis apply a force to drive the rotating workpiece along its length over the castors 38 of the roller bed towards the operating units at one end.

The workpiece can so be driven past the deburring tool 36, for the removal of any radially projecting material from the endmost portion of the outer surface of the workpiece, and up to the chamfering tool 34 at that end of the workpiece. FIGS. 1 and 3 illustrate machining of the left hand end of a workpiece. The tools 36 and 34 are rotated by their respective drive motors 232 and 186, and machining takes place all round the end periphery of the workpiece owing to continued rotation of the workpiece by the driving wheels 32. Axial movement of the workpiece is continued until the end stop provided by the roller 208 is engaged by the workpiece, and the workpiece-driving assemblies are allowed to return to their central positions. With machining of that end of the workpiece completed, the appropriate ones of the operating cylinders 98 and 100 are actuated to swing the two driving assemblies in the opposite direction, so to cause the workpiece to be driven axially up to the tools 34 and 36 of the other operating units. In that way the second end of the workpiece can also be deburred and chamfered. After machining of the second end is completed, the driving wheels 32 are employed to drive the workpiece axially back to the loading position between the operating units. The second lifting cylinder 268 of the loading/unloading means 40 can then be actuated to unload the machined workpiece from the machine, as hereinbefore described.

Within the limits imposed by the spacing (measured longitudinally of the machine) between each driving wheel 32 and its adjacent chamfering tool 34, and between the two driving wheels themselves, the machine can accept a wide variation in the lengths of workpieces in a particular batch for processing, that is without the machine having to be stopped for the positions of the operating units to be adjusted.

It is an important aspect of the function of the driving wheels 32 that they keep control of the rotation of the workpiece during machining. In the absence of adequate control by the driving wheels, there could be a tendency for the chamfering tools 34 and/or the deburring tools 36 themselves to impart rotations to the workpiece, which could be detrimental to the efficiency of the machining operations.

It will be understood that whilst the machine is described as set up for inside chamfering of tubular workpieces, it could be employed for outside chamfering of bar or tube ends.

I claim:

1. An end deburring and/or chamfering machine for the automatic or semi-automatic removal of material from the ends of elongate workpieces of round cross-section such as bar and tube, the machine comprising:
   (i) a base strucutre;
   (ii) workpiece - supporting means adapting to locate a workpiece for movement freely both in rotation about its longitudinal axis and lengthwise;
   (iii) workpiece loading means operative to load a workpiece from storage on to said workpiece-supporting means for machining;
   (iv) workpiece unloading means operative to unload the workpiece from said workpiece-supporting means after machining; and
   (v) opposite at least one end of the workpiece-supporting means an operating unit mounted on said base and supported by guides permitting movement of the unit along said base longitudinally towards and away from said workpiece-supporting means, the operating unit comprising:
   (a) a machining assembly; and
   (b) a workpiece-driving assembly whereby a workpiece on said workpiece-supporting means can both be driven lengthwise into engagement of one of its ends with a machining tool mounted on said machining assembly and be rotated during a machining operation on it by the tool, the driving assembly comprising a driving wheel arranged to make frictional engagement with the workpiece and mounted for pivotal movements to each side of a neutral position about an axis whereby the workpiece can be simultaneously rotated and moved lengthwise by rotation of the wheel when pivoted to one side or the other of its neutral position.

2. A machine according to claim 1 in which said machining assembly of the operating unit comprises a chamfering tool and the assembly comprises an adjustable stop member positionable for engagement by a workpiece to prevent further axial approach of the workpiece at a suitable position for completion of a chamfering operation by the tool.

3. A machine according to claim 1 in which said machining assembly of the operating unit comprises a chamfering tool, the machining assembly being pivotally mounted and the operating unit comprising means operable to pivot the assembly for variation of the angle at which the chamfering tool engages a workpiece.

4. A machine according to claim 1 in which said driving assembly as a whole is pivotally mounted in said operating unit to pivot said driving wheel about an axis extending perpendicular to its rotational axis and intersecting said rotational axis in the plane of the wheel.

5. A machine according to claim 4 in which the pivot axis of said driving assembly intersects also the longitudinal axis of a workpiece engaged by said driving wheel.

6. A machine according to claim 1 in which said driving assembly as a whole is pivotally mounted in said operating unit to pivot said driving wheel, said operating unit comprising spring means urging said driving assembly towards its neutral position and actuating means operable to swing the assembly to either side of said neutral position against the action of said spring means.

7. A machine according to claim 1 in which said driving assembly as a whole is pivotally suspended from a frame of said operating unit to pivot said driving wheel, said driving assembly comprising upper and lower suspension members interconnected by parallel linkage mechanism and said driving wheel being mounted on said lower suspension member whereby said wheel can be lowered and raised for movement respectively into and out from engagement with a workpiece on said workpiece-supporting means.

8. A machine according to claim 1 in which the workpiece-supporting means comprises a plurality of rollers for support of the workpiece in its rotational and lengthwise movements.

9. A machine according to claim 8 in which the rollers are provided by ball castors permitting both the rotational and lengthwise movements of a workpiece seated on them.

* * * * *

UNITED STATES PATENT AND TRADEMARK OFFICE
CERTIFICATE OF CORRECTION

PATENT NO. : 4,813,114

DATED : March 21, 1989

INVENTOR(S) : Derek W.R. Walker

It is certified that error appears in the above-identified patent and that said Letters Patent is hereby corrected as shown below:

On the title page Item (73) Assignee: delete "Lucas Industries public limited company, Birmingham, England".

Signed and Sealed this

Thirtieth Day of January, 1990

Attest:

JEFFREY M. SAMUELS

Attesting Officer  Acting Commissioner of Patents and Trademarks